Patented Apr. 7, 1936

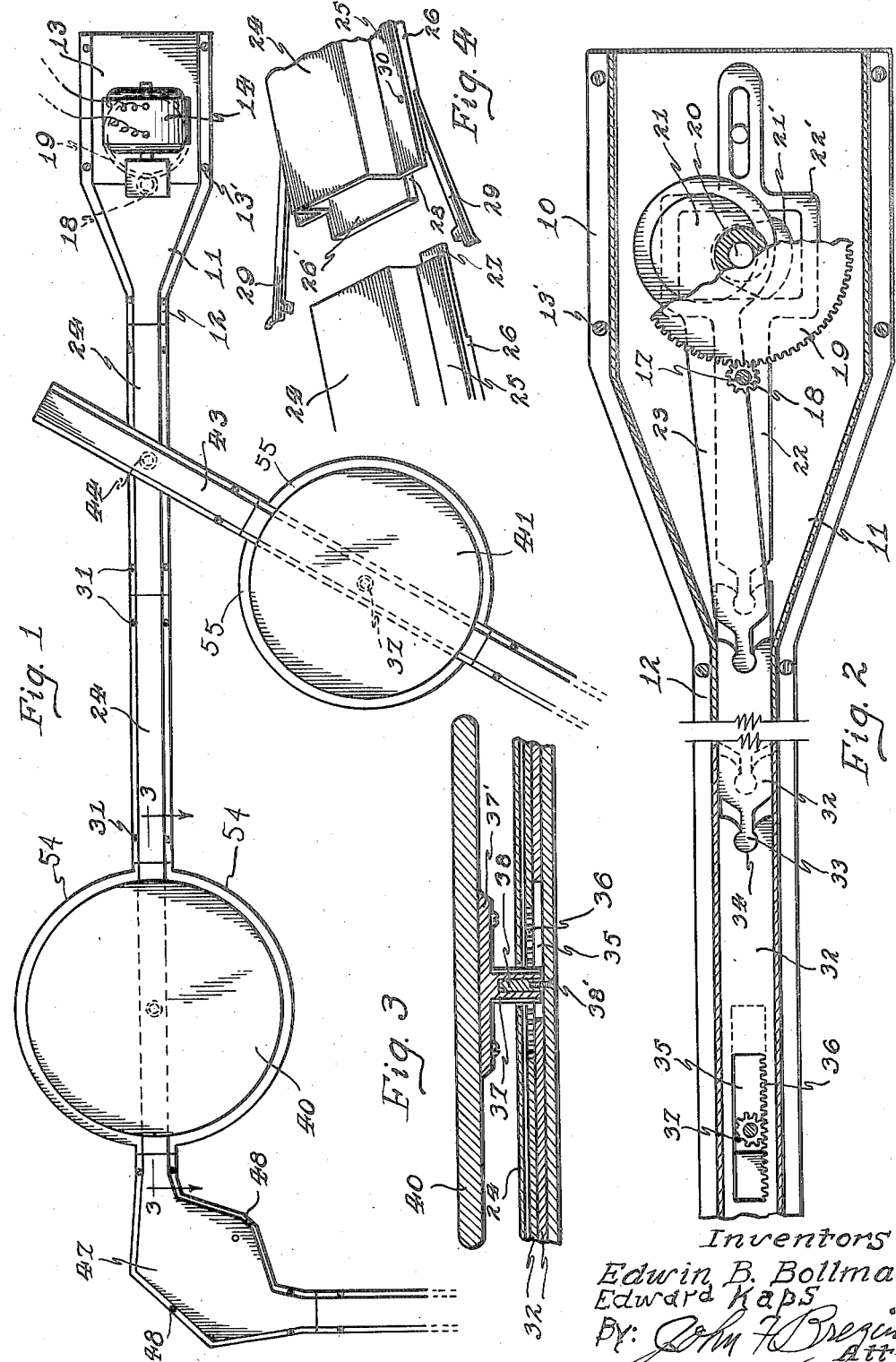

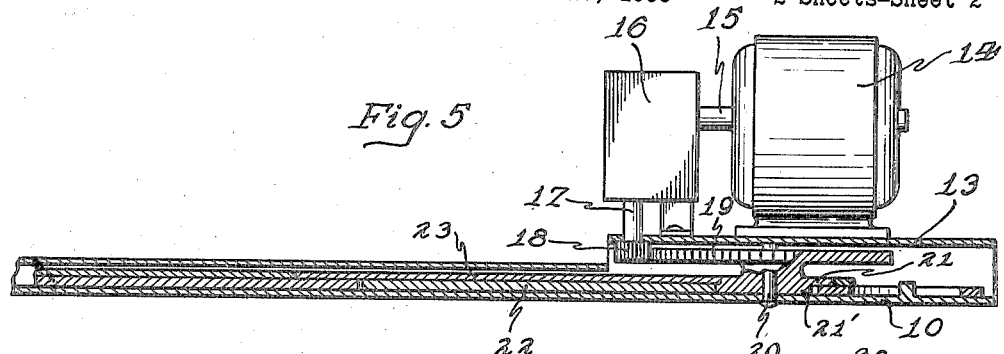
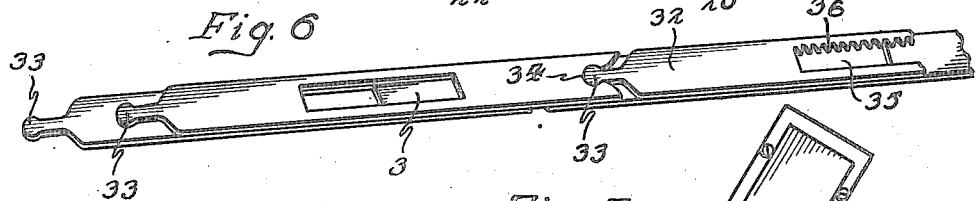
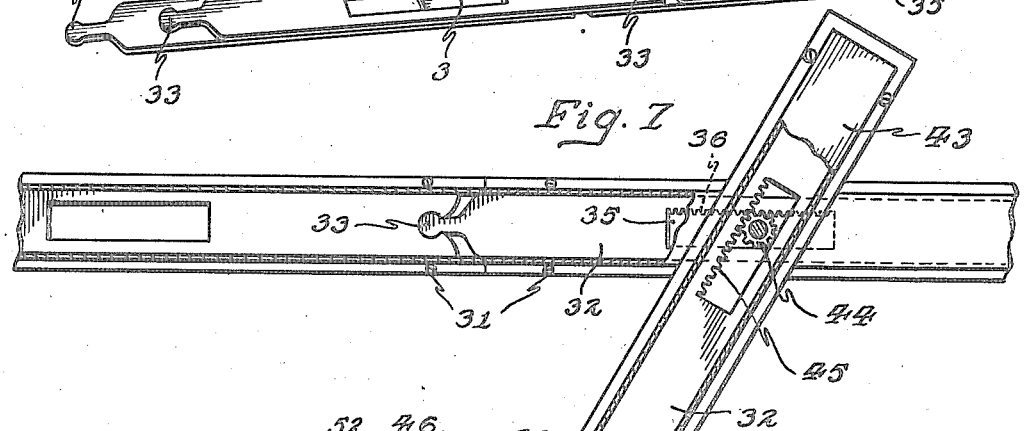
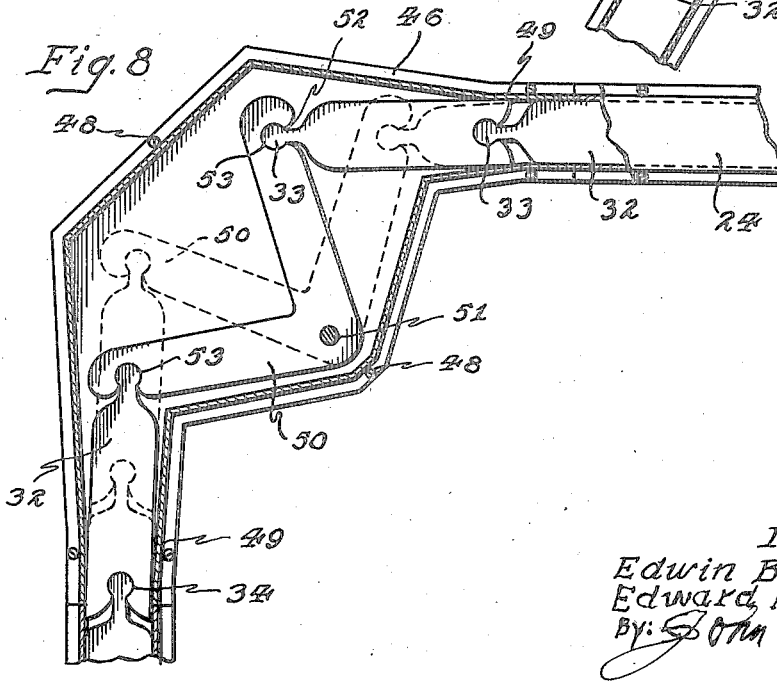

2,036,912

UNITED STATES PATENT OFFICE 2,036,912

POWER TRANSMISSION APPARATUS
FOR DISPLAYS

Edwin B. Bollman and Edward Kaps,
Chicago, Ill.

Application March 27, 1935, Serial No. 13,317

9 Claims. (Cl. 74—44)

The present invention relates to an apparatus for the transmission of power originating in any one of a number of known force producing devices and which force may be either reciprocating, compression, rotative, or a combination thereof, and is adapted to transmit in such movements in any desired direction either in the same or in different planes and as well as at substantially any angles which may be desired. Further, our novel power transmission mechanism is one which is flexible as to length as well as position; is capable of transmitting movement of desired degrees either horizontally, vertically or inclined directions and is so constructed as to be assemblable in part in order to accommodate restrictive space or to avoid stationary obstructions, and is readily adaptable to various uses where either one, two or more movable elements are to be actuated or moved from a single driving unit such as an electric motor.

Among the important objects of our invention is to provide inexpensive, improved, simplified, more efficient and quickly mountable or demountable driving mechanism for moving either one element such as a rotatable mounted platform either in complete rotation or in partial rotation, the latter being at any one of desired remote positions which may be required because of the construction of a display window or the like.

A further object of our invention is the provision of a transmission mechanism having a plurality of superposed reciprocable elements, each element being adapted to drive a moving element such as a rotatable mounted turntable, and said reciprocable elements being movable independently of each other although driven from a single and common driving mechanism or device such as an electric motor.

A further object of our invention is the provision of an apparatus including a plurality of reciprocable moving elements driven from a common driving force in combination with a longitudinal housing or conduit which is composed of a plurality of quickly assemblable sections, the number of conduit sections being flexible and variable to meet the requirements of the distance to which the reciprocating movement is desired to be transmitted.

A further object of our invention is the provision of an apparatus for transmitting movement from a common source in a plurality of directions, either horizontally, vertically or in an inclined direction, either through the medium of a single tunnel composed of a plurality of attachable conduit sections, or through two or more of such tunnels which may be positioned in different relative planes to meet the requirements of the particular window and its stationary obstructions.

Other and further objects of our invention will be apparent from the following description and claims.

This invention (in a preferred form) is illustrated in the drawings and hereinafter more fully described.

On the drawings

Fig. 1 is a top plan view of one form of our power transmission apparatus, illustrating a main bar-enclosing conduit with a turntable mounted thereabove, a typical housing employed at a right angle turn, and a second section of bar-enclosing conduit mounted in a plane above said main section.

Fig. 2 is an enlarged top plan view of the right hand portion of Fig. 1 with the cover removed and showing the internal driving mechanism and jointed bar section.

Fig. 3 is a cross sectional view taken on line 3—3 of Fig. 1 and showing a turntable in mounted position above the transmission apparatus.

Fig. 4 is an enlarged perspective view of adjacent connectable ends of two sections of the bar-enclosing conduit of our device.

Fig. 5 is a partial side elevational and partial cross sectional view of a typical driving motor, speed reducer conduit and reciprocable bars comprising a portion of our apparatus.

Fig. 6 is a perspective view of two adjacent superposed flexible bars, each comprising a plurality of jointed flexible bar sections or links.

Fig. 7 is an enlarged top elevational view showing the flexible bar-enclosing conduit, bar links therein and gear and rack means for transmitting reciprocable movement to a similar flexible bar, mounted in a higher plane.

Fig. 8 is an enlarged top elevational view of a corner housing connecting two conduits at right angles to each other, and lever means for transmitting the reciprocable movement at right angles.

As shown on the drawings:

The reference numeral 10 indicates a metal housing, which may be of any desired shape, for enclosing the mechanism for transmitting rotative movement into reciprocating movement and which is preferably flat and of rectangular cross section. Metal housing 10 preferably is tapered and reduced as indicated at 11 and terminates in an integral rectangular opening. Portion 12 which is rectangular cross section and of a dimension identical with the bar-enclosing conduit hereinafter described. Housing 10 has a removable cover plate 13 which is attachable thereto by means of a plurality of screws 13', as shown in Figs. 1 and 2.

A preferred form shown in the drawings illustrates an electric motor 14 having a driving shaft 15 which is connected to and directly drives a speed reducer 16, which speed reducer in turn drives vertical rotatable shaft 17 upon the lower end of which is a pinion 18, said pinion being in mesh with and driving gear wheel 19. Said gear wheel is preferably mounted for rotative movement in a horizontal plane and upon vertical axle shaft 20 which is secured in a suitable aperture in the bottom of housing 10, as clearly shown in Fig. 5. Secured to the underside of gear wheel 19 to rotate therewith and concentrically therewith is an integral eccentric cam 21 as shown.

A flat connecting rod 22 has one end thereof formed into an annular ring 22' in which driven cam 21' is rotated, said cam 21' being securely mounted on shaft 20 as shown in Fig. 5. Said connecting rod 22 has its other end formed into a projecting ball joint, as clearly shown in Fig. 2. A second flat metal connecting rod 23 has one end rotatably mounted on eccentric cam 21 and is similarly reciprocated due to its engagement on cam 21'. It will be apparent that because of the projection of cam 21 in a direction opposite to cam 21', the connecting rods 22 and 23 will be reciprocated alternately in opposite directions of travel.

The conduit or channel for enclosing and guiding the flexible transmission bar or bars herein described is clearly shown in top elevation in Fig. 7, in the perspective Fig. 4 and in top plan view in Figs. 1 and 2. Said conduit comprises a plurality of U-shaped channel sections 24, as shown in Fig. 4, the perpendicular flanges of which have integral horizontally extending flanges 25 turned outwardly and parallel with top portion of said section 24. The bottom of said conduit which completes the enclosure and which serves as a base and support for the slidable flexible bar herein described, comprises a flat relatively thin bar 26, said bar being preferably of a width equal to the entire channel 24. The channels of certain of said conduit sections have suitable apertures therein to permit mounting of rotatable shafts hereafter described.

The base of bar 26 of each said conduit sections is so positioned that one end thereof projects beyond the end of channel 24, whereas the other end of said base bar 26 is terminated shorter than the end of channel 24, this being for the purpose of providing interfitting and inter-engagement of the projecting end 26' with the corresponding recess of the end of an adjacent conduit section 24. It is to be noted that only the central portion of the base bar 26 is cut away at one end of the conduit section, permitting the edges of each said base bars at such end to form projecting ends 27, as shown in Fig. 4. When two of the conduit sections 24 are to be joined in partially telescopic and interfitting relation, said two sections are placed into the position shown in Fig. 4 and then pushed together so that the opposite projecting ends 27 fit into recess 28 of the base bar 26, which recesses are formed by cutting away the opposite corners as clearly indicated in the drawings. A pair of pivotally mounted fastening hooks 29 are mounted at opposite edges of base bar 26 by means of suitable pivots 30, said hooks 29 having suitable integral abutments at their free ends which are adapted to engage in recesses on the base bar 26 of the adjacent conduit section to thereby releasably lock the adjacent conduit sections together.

As clearly shown in Figs. 1 and 8, the channel 24 of each of said conduit sections is removably mounted from the base bar 26 by means of suitable screws 31 which pass through suitable apertures in flanges 25 of channel 24 and threadingly engaging base bar 26. It is to be noted, and as clearly shown in Figs. 1 and 2, that the channeled conduit section 24 immediately adjacent the housing 10 has one end thereof telescopically and detachably secured to the corresponding reduced end 12 of housing 10.

Each of the units of our invention may comprise either one, two or more jointed-together conduit sections 24, the number and length thereof being dependent upon the remoteness and position of the movable element to be rotated, reciprocated, or otherwise moved. An important feature of the adaptability and convenience of our invention resides in that changeability of length, quick detachment and dismounting and changing of position with ease and without cost or change of parts.

As shown in Fig. 2, which is the top plan view of the preferred form of our device with the cover removed, the flexible bar of our invention, two of which are shown in Fig. 6, comprises a plurality of conduit sections 32, which are formed of relatively thin flat metal bars and which have one end thereof formed into a projecting ball joint 33, the other end of each of said bars being bifurcated, each bifurcation being inclined toward the center of bar and terminating in an annular aperture 34 of a size for convenient reception of the ball joint 33, all of which are of the same size. It will be readily apparent that a plurality of the bar sections or links 32 may be readily assembled to substantially any desired length, the end link or bar section 32 having its socket in jointed relation with the ball joint 33 on the free end of either of the reciprocating connecting rods 22 or 23. The bar sections or links 32 are of a width to freely fit and slide within a plurality of joined-together conduit sections 24.

As shown in Figs. 2, 6, and 7 certain of said bar links 32 have a relatively long rectangular aperture 35 formed therein, a row of rack teeth 36 being simultaneously formed integral with each such bar link 32. A pinion 37, of a size to fit within said aperture, meshes with rack teeth 36, said pinion 37 being formed integral with mounting plate 37' which has a turntable secured thereto as clearly shown in Fig. 3. Said pinion 37 is rotatable and journaled upon a short shaft 38 which is secured perpendicularly to the base plate 26 of the respective conduit section by means of a threaded screw 38' which passes from the bottom of and through said base plate and threadingly engages threaded aperture in said shaft. The upper end of said short shaft 38 is preferably bevelled to reduce friction.

Where it is desired that a movable turntable, platform or other movable element be rotated at a desired point, the flexible bar is so assembled that one of the bar links 32 which has said longitudinal aperture 35 and rack teeth will be positioned substantially below such object sought to be moved, whereupon a pinion 37 is placed in position upon one of vertical shafts 38 to be rotated in alternate directions by rack teeth 36 of the reciprocating bar link 32. Where two or more rotatable turntables are to be mounted and moved in spaced apart positions, it will be readily apparent that bar links 32 having rack teeth 36 upon longitudinal apertures thereof may be positioned in the flexible bar to accord with the desired position of the movable elements to be moved. For example, in Fig. 1 reference numeral 40 indicates a turntable to be alternately rotated at a remote point in the manner herein described and reference numeral 41 indicates another turntable which is to be rotated at a point in non-alignment with the main flexible bar and in a higher plane.

To transmit the reciprocable movement to turntable 41 it is only necessary to mount a plurality of the conduit sections 24 in a plane a short distance below the desired position of the upper turntable 41 to form an enclosure and guiding means for a plurality of joined-together flexible bar sections 32 therein, one of said bar sections having gear teeth driving a suitable pinion similar to pinion 37 which in turn is connected to and rotates the turntable 41, in the same manner as shown at the left of Fig. 2. Annular ring elements 54 of metal are securely mounted with respect to the channel 24 of the conduit section mounted below the turntable, this being for the purpose of preventing any tipping because of the weight of an object which may be placed on turntable 40. Ring elements 55 are for the same purpose and are adapted to rest upon some stationary support (not shown) to prevent such tilting movement.

To transmit a reciprocating movement to the joined-together bar sections in the upper conduit 43, the upper end of shaft 38 has mounted thereon a second upper pinion 44, as shown in Fig. 7, which pinion 44 has an upper integral portion which is secured to the turntable. Pinion 44 is in mesh with rack teeth 45 formed in longitudinal aperture of one of the bar links 32, which bar link is slidably mounted in the upper conduit 43. Conduit 43 may extend in any one of a number of desired directions to rotate or reciprocate a movable element in the same manner as heretofore described.

Where it is desired to transmit the reciprocating element in a direction substantially perpendicular to that originally permitted by the first portion of the flexible bar comprising jointed sections 32, we provide a housing 46 of the shape shown in Fig. 8 showing the cover removed, said housing having a suitable cover 47 as shown in Fig. 1, removably secured thereto by suitable screws 48. Said housing 46 has two outlets 49 which extend in directions at right angles to each other and which are constructed to interfit with respective ends of conduit sections 24 in the same manner as said conduit sections fit into each other. A right angle lever 50 is pivoted within said housing 46 for movement parallel to the bottom of said housing, pivot 51 forming such pivotal connection. Each end of the lever 50 is bifurcated as at 52 to form an annular aperture or socket 53 which removably receives one of the ball joints of bar links 32. The opposite end of the lever is constructed identically to that just described, such opposite end being adapted to receive the ball joint 33 of one of the bar links which latter bar links are thereby movable in a direction substantially perpendicular to the direction of movement of the bar links which impart movement to the opposite end of said lever 50.

It will be apparent that a plurality of conduit sections may be conveniently assembled together with relative ease and thereupon effecting the simultaneous connecting together of a plurality of bar links, those bar links having longitudinal apertures with rack teeth being positioned at locations beneath which the rotatable turntable or other element is to be moved. Thereafter the turntable with its attached perpendicular pinion 38 may be inserted through the apertures of the channel members of the bar sections and into mesh with the rack teeth 36, a vertical shaft 38 having been previously mounted to the base plate of the particular or respective conduit section. If it is desired to reverse the movement of the turntable or similar element it is only necessary to disassemble two adjacent sections and turn over the bar link so that its gear teeth will be on the opposite side.

We are aware that numerous details of construction may be varied through a wide range without departing from the principles of this invention, and we do not desire our invention to be limited to the particular details shown.

We claim as our invention:

1. A mechanical movement for simultaneously moving a plurality of spaced apart animated displays comprising a driven gear wheel; a cam concentrically mounted to rotate with said gear wheel; a movably mounted metal frame in which said cam is rotatable, said cam being adapted to reciprocate in said frame; guide means for said frame; a reciprocating drive rod formed integral with said frame and terminating in a ball joint; flexible bars each bar comprising a plurality of detachable jointed-together bar sections, the end section of each thereof being connected to said drive rod; and an adjustable, detachable and flexible guide conduit for said flexible bars, said guide conduit comprising a plurality of hollow sections detachably connected together; releasable interlocking members on the ends of said conduit sections whereby the same may be releasably connected together; certain of said bar sections having elongated rack teeth; and movable means engageable with and driven by said rack teeth for transmitting movement of said bar sections to objects rotatably connected thereto.

2. A mechanical movement comprising a driven gear wheel; eccentric cams connected concentrically to and driven by said gear wheel; a pitman rod having one end connected to and reciprocably driven by one of said cams, said rod terminating in a ball joint; a hollow conduit comprising a plurality of connected-together detachable sections, said conduit being connected to and communicating with said housing; a plurality of flexible bars slidable in said tunnel, said flexible bar comprising a plurality of jointed bar links, one of said links being detachably connected to said ball joint on said pitman rod, certain of said links having elongated slots and integral rack teeth; rotatably mounted shafts extending into said link slots; pinions on said shafts meshing with said rack teeth; and slidably mounted elements rotatably connected to said shafts, said shafts being adapted to transmit reciprocating movement to movable elements rotatably connected to said shafts.

3. A mechanical movement for transmitting power from a common power source to a plurality of separate remote points comprising a driven gear wheel; a reciprocable connecting rod slidably mounted; means on said gear wheel and driven thereby and engaging said connecting rod for imparting reciprocating movement to said connecting rod, said connecting rod having a ball joint at its free end; a flexible bar mounted for slidable movement comprising a plurality of jointed-together bar sections; a guide channel in which said flexible bar is slidably mounted; a removable cover on said guide channel, said guide channel comprising a plurality of disconnectible sections, certain of said bar sections having longitudinally extending apertures therein; gear teeth formed integral with each said bar sections along said side of each longitudinal apertures; a pinion engaging the rack teeth of each said apertures; a vertically extending shaft in each of said pinions and driven thereby; a pinion at the opposite and upper end of each of said shafts; and a flexible slidably mounted bar mounted in substantially the same plane with said last mentioned upper pinion, said last mentioned upper flexible bar having rack teeth meshing with said upper pinion and reciprocated thereby.

4. A mechanical movement for transmitting power from a common power source to a plurality of separate remote points comprising a driven gear wheel; a plurality of and connected to and driven by said gear wheel reciprocable connecting rods engaging said gear wheel and driven thereby; a flexible bar detachably connected to each of said conecting rods, said flexible bars being in adjacent and superposed position; a guide channel for guiding said flexible bars and comprising a plurality of detachable sections; a cover removably mounted on said guide channel, certain of said flexible bar sections having longitudinally extending apertures therein; rack teeth on each of said bar sections having an aperture and extending into said aperture; a pinion in each said apertured flexible bar sections and engaging the rack teeth thereof; a rotatable shaft in each said pinion; a second pinion on each said rotatable shafts in a plane different from said flexible bar sections; and a plurality of reciprocable jointed-together flexible bar sections having gear teeth therein and driven by each of said last-mentioned pinions respectively.

5. A mechanical movement comprising a main housing; a driven gear wheel therein; a pair of eccentric cams connected concentrically to and driven by said gear wheel; a connecting rod having one end connected to and reciprocably driven by one of said cams, said rod terminating in a ball joint; a tunnel comprising a plurality of detachable sections and connected to and communicating with said housing; a flexible bar slidable in said tunnel, said flexible bar comprising a plurality of jointed bar links, one of said end bar links being detachably connected to said ball joint on said connecting rod, certain of said links having longitudinal apertures therein; rack teeth on said apertured bar links; a pinion engaging said rack teeth; and a shaft on which said pinion is mounted, said pinion being connected to and movable with a movable element.

6. A mechanical movement for transmitting power from a common power source to a plurality of separate remote points comprising a driven gear wheel; a reciprocable connecting rod slidably mounted and connected to said gear wheel; means on said gear wheel and driven thereby engaging said connecting rod for imparting reciprocating movement to said connecting rod, said connecting rod having a ball joint at its free end; a flexible bar mounted for slidable movement and comprising a plurality of jointed-together bar sections; a tunnel in which said flexible bar is slidable and reciprocable, said tunnel comprising a plurality of detachable and disconnectible sections, certain of said bar sections having longitudinally extending apertures therein; rack teeth formed integral with each said apertured bar and extending into said aperture; a pinion engaging the rack teeth of each said aperture; said pinion being connected to a turntable; a shaft having one end secured in said conduit section, said pinion being rotatable on said shaft; a flexible bar mounted for reciprocating movement in a plane different from said last mentioned flexible bar comprising a plurality of jointed bar sections, one of said bar sections having an aperture therein and having gear teeth thereon, and a second pinion on the other end of said shaft and engaging said gear teeth of said second mentioned flexible bar to reciprocate the same.

7. In a device of the class described for transmitting movement from a single driving source to a plurality of separate remote points, a metal housing; a driven gear wheel therein; a pair of adjacent cams connected to and rotatable with said gear wheel; a reciprocal eccentric bar in said housing having one end rotatably engaging and driven by one of said cams; a second eccentric bar in said housing adjacent to said first bar and rotatably engaging and driven by the second of said cams, the free ends of each of said bars terminating in a headed stud; an elongated metal conduit having one end connected to and communicating with one end of said housing; a flexible bar comprising a plurality of releasably connected together bar links slidably mounted in said conduit; a second flexible bar in said conduit in superposed adjacent relation to said first bar, said bars being adapted to move independently of each other, each of said flexible bars comprising a plurality of jointed together relatively flat metal links, one end of each bar link having a projecting headed stud and the opposite end of each said bar link being bifurcated and apertured and releasably attached to the headed stud of the adjacent section; certain of said bar links having a substantially rectangular longitudinally extending aperture, one edge of each said aperture being serrated to form gear teeth; a perpendicularly extending axle rotatably mounted and extending through said link aperture, and a pinion secured on said axle in mesh with and drivable by said gear teeth on said link to thereby rotate said axle, said axle being adapted to impart rotation to an object attached thereto.

8. In a device of the class described for transmitting movement from a single driving source to a plurality of separate remote points, a metal housing; a driven gear wheel therein; a pair of adjacent cams connected to and rotatable with said gear wheel; a reciprocal eccentric bar in said housing having one end rotatably engaging and driven by one of said cams; a second eccentric bar in said housing adjacent to said first bar and rotatably engaging and driven by the second of said cams, the free ends of each of said bars terminating in a headed stud; an elongated metal conduit having one end connected to and communicating with one end of said housing; a flexible bar comprising a plurality of releasably connected together bar links slidably mounted in said conduit; a second flexible bar in said conduit in superposed adjacent relation to said first bar, said bars being adapted to move independently of each other, each of said flexible bars comprising a plurality of jointed together relatively flat metal links, one end of each bar link having a projecting headed stud and the opposite end of each said bar links being bifurcated and apertured and releasably attached to the headed stud of the adjacent section; certain of said bar links having a substantially rectangular longitudinally extending aperture, one edge of each of said apertures being serrated to form gear teeth; perpendicularly extending axles rotatably mounted and one thereof extending through each of said link apertures; and a pinion on each of said axles normally driven by said link gear teeth; said rotatable pinion being adapted to impart rotating movement to objects attached thereto.

9. In a device of the class described for transmitting movement from a single driving source to a plurality of separate remote points, a metal housing; a driven gear wheel therein; a pair of adjacent cams connected to and rotatable with said gear wheel; a reciprocal eccentric bar in said housing having one end rotatably engaging and driven by one of said cams; a second eccentric bar in said housing adjacent to said first bar and rotatably engaging and driven by the second of said cams, the free ends of each of said bars terminating in a headed stud; an elongated metal conduit having one end connected to and communicating with one end of said housing; a flexible bar comprising a plurality of releasably connected together bar links slidably mounted in said conduit; a second flexible bar in said conduit in superposed adjacent relation to said first bar, said bars being adapted to move independently of each other, each of said flexible bars comprising a plurality of jointed together relatively flat metal links, one end of each bar link having a projecting headed stud and the opposite end of each said bar link being bifurcated and apertured and releasably attached to the headed stud of the adjacent section; certain of said bar links having a substantially rectangular longitudinally extending aperture, one edge of each said aperture being serrated to form gear teeth; a perpendicularly extending axle rotatably mounted and extending through said link aperture, and a pinion secured on said axle in mesh with and drivable by said gear teeth on said link to thereby rotate said pinion, said pinion being adapted to impart rotation to an object attached thereto; a second conduit section mounted in a plane different from the plane of said first mentioned conduit, said last mentioned conduit section comprising a plurality of connected together assemblable conduit sections, certain said sections having slots therethrough; a rotatably mounted axle projecting substantially perpendicularly through slots of both said conduits; a plurality of connected together bar links in said second mentioned conduit, certain of said bar links having elongated apertures and gear teeth therealong; spaced apart pinions secured on said axle, one of said pinions being in mesh with the gear teeth of the movable links of said first mentioned flexible bar member, a second pinion of said axle being in mesh with the gear teeth of a link of said second mentioned flexible bar member, the reciprocating movement of said first mentioned flexible bar member being transmitted to said second flexible bar member.

EDWIN B. BOLLMAN.
EDWARD KAPS.